Oct. 4, 1966  H. J. FREMDER  3,276,687
TRAILER USE COUNTER
Filed Dec. 1, 1964  3 Sheets-Sheet 1
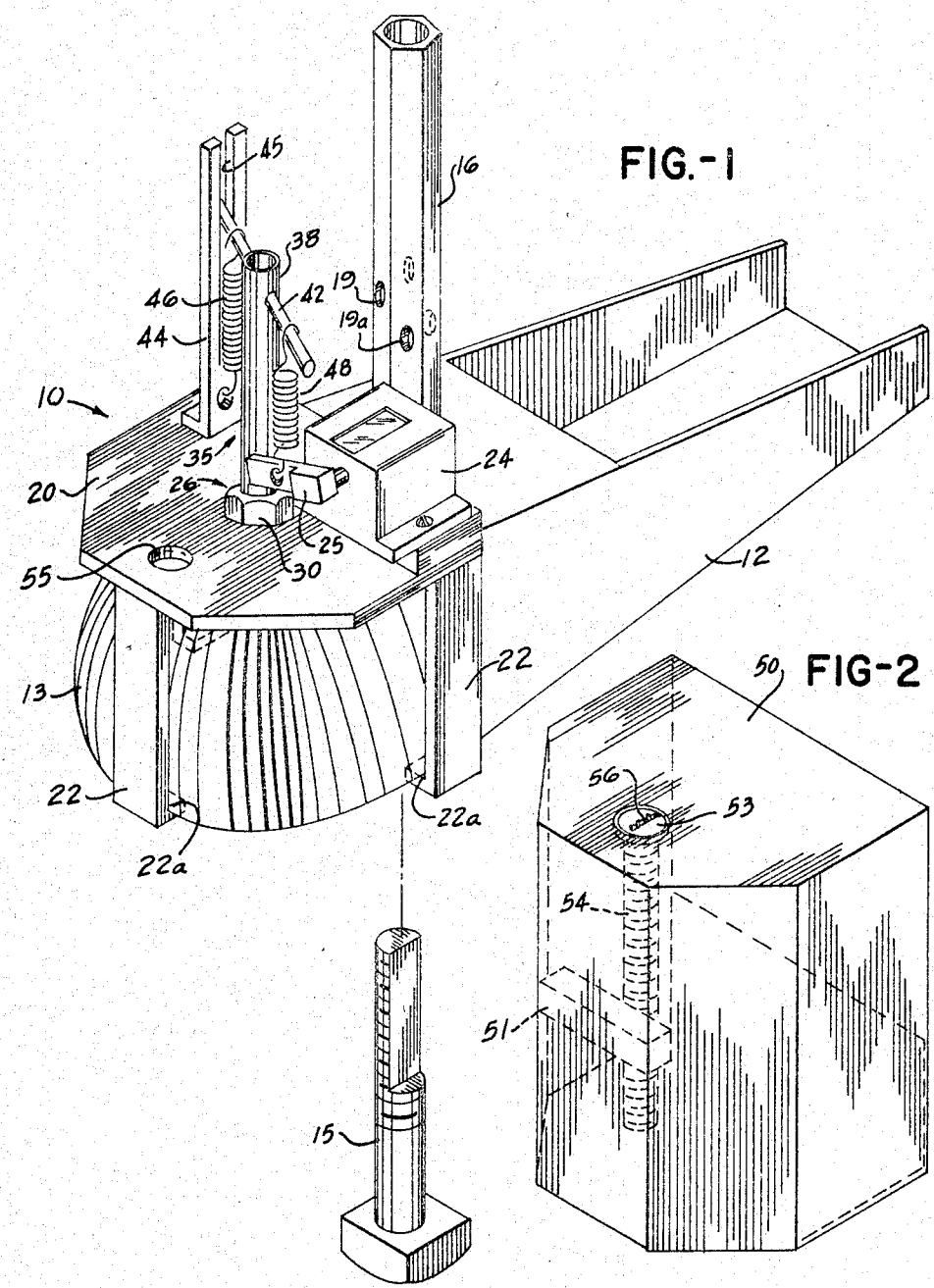
INVENTOR.
HOWARD J. FREMDER
BY
MORGAN, FINNEGAN, DURHAM & PINE
ATTORNEYS Oct. 4, 1966
H. J. FREMDER
3,276,687
TRAILER USE COUNTER
Filed Dec. 1, 1964
3 Sheets-Sheet 2
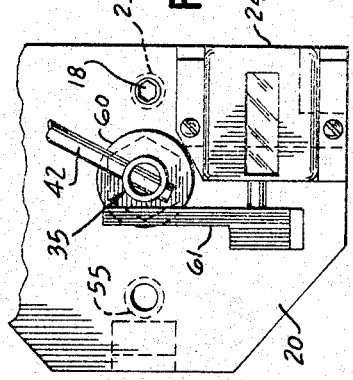
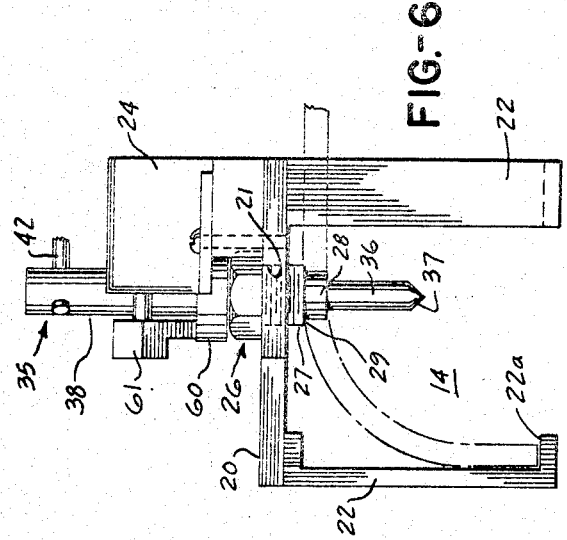
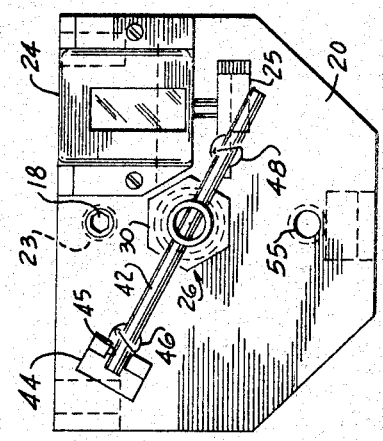
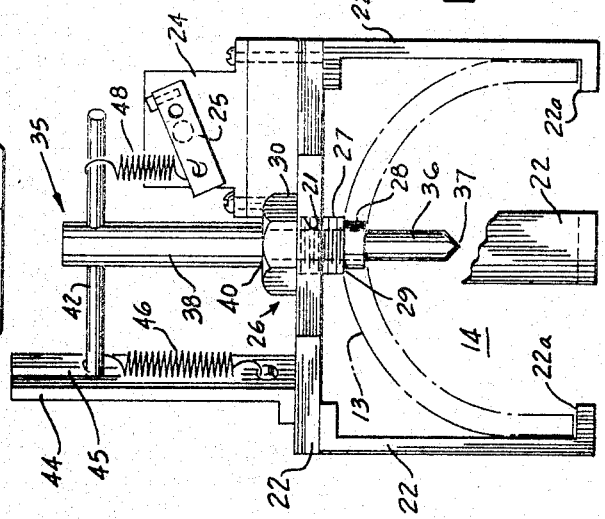
INVENTOR.
HOWARD J. FREMDER
BY
MORGAN, FINNEGAN, DURHAM & PINE
ATTORNEYS

United States Patent Office 3,276,687
Patented Oct. 4, 1966

3,276,687
TRAILER USE COUNTER
Howard Jay Fremder, 7714 Bay Parkway,
Brooklyn, N.Y.
Filed Dec. 1, 1964, Ser. No. 415,017
3 Claims. (Cl. 235—91)

The present invention relates generally to counter attachments, and relates more particularly to a novel counter attachment to be mounted on the tongue or coupler of a trailer to provide a means for registering the number of times the trailer is hitched to a vehicle.

At the present time, there is a substantial business throughout the United States of renting trailers to be hitched to cars, trucks, or other similar pulling vehicles for hauling purposes. It is often desirable for the owner of a fleet of such trailers to utilize an intermediate rental outlet for renting the trailers, such as, for example, an automobile service station. In such case, it is desirable for the trailer owner to know how many times each trailer is rented out over a period of time in order to have some means of checking the reliability of the rental agency. Heretofore, no such means has been available.

It is, therefore, an object of this invention to provide a means for registering the number of times a trailer is hitched to a pulling vehicle.

Another object of this invention is to provide a means for independently determining the number of times a trailer has been hitched to a vehicle, which is accurate and reliable.

Another object of this invention is to independently determine the number of times a trailer has been rented by providing a means for counting the number of times the trailer is hitched to a vehicle.

Another object of this invention is to independently determine the number of times a trailer has been rented by providing a counter attachment for the trailer coupler which actuates a registering mechanism each time the coupler is hitched to a vehicle.

A further object of this invention is to provide a counter attachment for a trailer coupler which cannot easily be actuated accidentally or unintentionally.

A further object of this invention is to provide in a counter attachment for a trailer coupler, cover means lockably housing the registering mechanism of the counter attachment to prevent unauthorized tampering of the registering mechanism.

A still further object of this invention is to provide in a counter attachment for a trailer coupler, means for lockably hitching the trailer coupler to the vehicle to prevent the trailer from being disconnected before being returned to the rental agency.

Objects and advantages of the invention are set forth in part herein and in part will be obvious herefrom, or may be learned by practice with the invention, the same being realized and attained by means of the instrumentalities and combinations pointed out in the appended claims.

Briefly described, the present invention comprises mounting a counter attachment onto the tongue or coupler of a trailer, the counter attachment including a reciprocable plunger member adapted to be operatively associated with the vehicle hitch to which the trailer is to be connected and a registering mechanism, so that upon hitching the trailer to the vehicle, the plunger is displaced by the vehicle hitch to thereby actuate the registering mechanism. The plunger member is spring return-biased so that upon disconnecting the trailer coupler from the vehicle hitch, the plunger is returned to a position from which it may again be displaced. A stiff return spring is preferably utilized so as to strongly resist displacement to thereby prevent the registering mechanism from being actuated accidentally or unintentionally. A lockable cover is provided to house the elements of the counter and prevent unauthorized actuation of the registering mechanism. Also, means are provided for locking the trailer coupler to the vehicle hitch to prevent the trailer from being disconnected before being returned to the rental agency.

According to a first embodiment, the reciprocable plunger member comprises a rod extending through the trailer coupler housing having a cross-bar at its upper end and the lower end preferably terminating in a point, the rod being in operative association with the registering mechanism by means of a pull spring extending between one end of the cross-bar and the register counter arm. Upon axial displacement of the rod, the counter arm is actuated by the pull spring, thereby registering the displacement. A return spring on the other end of the cross-bar return the rod to a position from which it may again be displaced.

Another embodiment of the counter attachment comprises a plunger rod having an integral, upwardly-facing shoulder on which the counter arm of the registering mechanism rests. Upon axial displacement of the rod, the counter arm is actuated directly by the movement of the rod, thereby registering the displacement.

A further embodiment of the counter attachment comprises a plunger rod in the form of a rack, mounted in meshed engagement with a pinion, the pinion serving as the counter arm of the registering mechanism. Upon axial displacement of the rack, the pinion is rotated, thereby registering the displacement on the registering mechanism. As in the previous embodiments, the rack is provided with a cross-bar having a return spring connected thereto so as to return the rack to a position from where it may again be displaced.

The invention consists in the novel parts, constructions, arrangements, combinations and improvements herein shown and described.

It will be understood that the foregoing general description and the following detailed description as well are exemplary and explanatory of the invention but are not restrictive thereof.

The accompanying drawings, referred to herein and constituting a part hereof, illustrate preferred embodiments of the invention and, together with the description, serve to explain the principles of the invention.

Of the drawings:

FIGURE 1 is a perspective view of a counter attachment embodying the invention, illustrated mounted to a conventional trailer coupler housing;

FIGURE 2 is a perspective view of a cover for the counter attachment shown in FIGURE 1;

FIGURE 3 is a top plan view of the counter of FIGURE 1;

FIGURE 4 is a front elevation, partly broken away, of the counter of FIGURE 1, illustrating the trailer coupler housing diagrammatically;

FIGURE 5 is a fragmentary top plan view of a modified counter attachment embodying the invention;

FIGURE 6 is a fragmentary side elevation of the modified counter shown in FIGURE 5;

Figure 7:
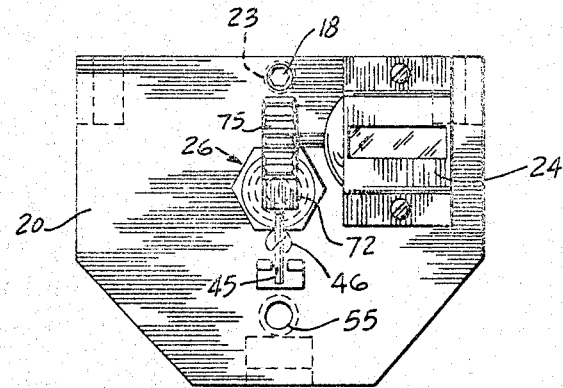
FIGURE 7 is a top plan view of a second modified counter attachment embodying the invention.

Referring now more particularly to the invention as shown in the accompanying drawings, there is illustrated in FIGURES 1-4 a counter attachment, designated generally by reference numeral 10, mounted to coupler or tongue 12 of a trailer.

Coupler 12 may be of any conventional design but is preferably formed at the coupling end thereof with a generally spherically-shaped housing 13, which forms a cavity 14 shaped so that the housing fits snugly over a conventional ball hitch (not shown) mounted to a vehicle which pulls the trailer. Housing 13 also preferably includes a conventional bifurcated tongue member (not shown) adapted to slide under the ball and to draw coupler housing 13 securely onto the ball hitch by means of cut-out bolt 15, which passes through the tongue member and coupler housing and threads into elongated nut 16 as is more fully described hereinbelow.

Counter attachment 10 includes a base plate 20, carrying a suitable registering mechanism 24, adapted to rest on the top of spherical housing 13 of trailer coupler 12. Plate 20 and housing 13 are provided with aligned holes for insertion therethrough of a bushing member 26. Bushing 26 includes a threaded portion 27 adapted to thread into threaded hole 21 in plate 20, an unthreaded portion 28 adapted to pass into the hole formed in the top of housing 13, and is preferably formed with a hexagonal exterior at its upper end 30 so that it may be engaged and turned by an open-ended wrench. Portions 27 and 28 of bushing 26 are separated by a shoulder 29 adapted to rest on the housing 13 about the hole formed therein.

Plate 20 has depending legs 22 extending therefrom, each leg terminating in lateral extension 22a which fit under the bottom edges of the coupling housing. Plate 20 is secured to coupler housing 13 by threading bushing 26 into bore 21 until shoulder 29 bears tightly against the housing, thereby pulling depending legs 22 upwardly against the bottom edges of the coupler housing. Any additional slack between the base plate 20 and the coupler housing may be taken up by set screw 18 threaded into bore 23 of the base plate and bearing against the top surface of the coupler housing.

In accordance with the invention, counter attachment 10 includes a reciprocal plunger member adapted to be operatively associated with a vehicle hitch and a registering mechanism so as to register each time the plunger is displaced as a result of the trailer coupler being connected to a vehicle hitch.

In a first embodiment, the reciprocable plunger member comprises a rod 35, which may be solid or tubular, having a lower portion 36 extending through bushing 26 and terminating within cavity 14 formed by spherical housing 13. Preferably, the end of the rod is formed in a point 37, more fully explained hereinbelow. The upper portion 38 of rod 35 extends above the hexagonal portion 30 of bushing 26 and is of greater diameter than lower portion 36 so as to form a shoulder 40 which rests on portion 30. A cross-bar 42 is provided near the upper end of rod 35, one end of which rides in a slot 45 of an upright guide member 44. A return spring 46 is connected between cross-bar 42 and guide 44, biasing shoulder 40 of rod 35 against the upper part 30 of bushing 26 so as to position end 37 of rod 35 approximately midway within cavity 14, as illustrated in FIGURE 4.

Rod 35 is operatively associated with registering mechanism 24 by means of pull spring 48, connecting cross-bar 42 to the register counter arm 25. It will be seen that axial displacement of rod 35 pulls up counter arm 25 through spring 48 to thereby register the displacement and that, upon release of the rod displacing force, spring 46 returns the rod into a position from where it may again be displaced.

It will be understood that the particular lengths of the upper and lower portions of rod 35, and the distance that lower portion 36 extends into cavity 14 will depend on such factors as the length of the displacement "stroke" required to turn over the registering mechanism and the thickness of the coupler housing. It has been found desirable to provide rod 35 slightly longer than necessary so as to accommodate differences in thickness of trailer coupler housings; pull spring 48 compensates for any resulting override in the displacement of the rod.

A modified embodiment of the counter attachment is shown in FIGURES 5 and 6, the reciprocable plunger rod 35 being provided with an integral, upwardly-facing shoulder 60 and registering mechanism 24 having an elongated counter arm 61 resting on shoulder 60. Axial displacement of the rod directly actuates the counter arm, registering the movement.

Figure 8:
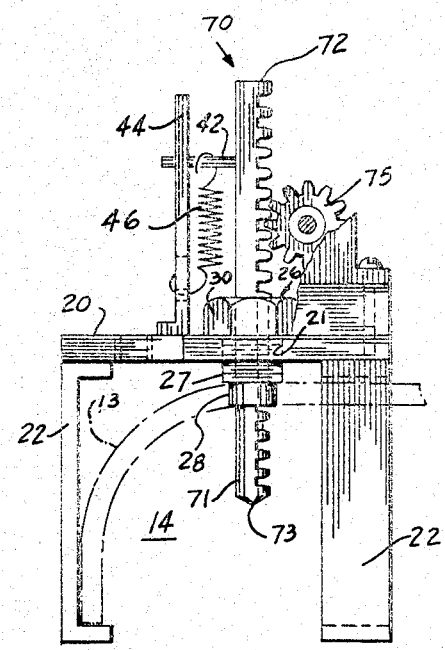
FIGURE 8 is a fragmentary side elevation of the modified counter shown in FIGURE 7.

A further modification of the counter attachment is shown in FIGURES 7 and 8. In this embodiment, the reciprocable plunger member comprises a rack 70 mounted in bushing 26, rack 70 preferably having a round lower portion 71 extending through the bushing and a square upper portion 72 extending above the hexagonal portion 30 of the bushing, the shoulder formed between the upper and lower portions resting on the bushing. Square portion 72 is in meshed engagement with pinion 75, pinion 75 serving as the counter arm of registering mechanism 24. As in the previous embodiments, rack 70 terminates at a point 73 within cavity 14 and is provided with a cross-bar 42 at its upper end connected to a return spring 46.

The modified embodiments may be preferable where the coupler housings have a standard thickness and compensation for override is not necessary.

In each of the foregoing embodiments, means are provided to prevent manual actuation of the registering mechanism after the counter attachment has been securely mounted to the trailer coupler. To this end, a cover 50 is provided having an open bottom and side walls shaped so as to permit the cover to be placed over the base plate 20. A shoulder 51 formed on the inner side of the forward side wall of the cover rests on base plate 20 and provides a firm locating point for the cover. A conventional lock screw 53 is fitted in the top wall of the cover, the screw portion 54 thereof being elongated and adapted to thread into threaded bore 55 of base plate 20. Screw 54 can be turned only upon inserting the proper key into key-opening 56 of the lock-screw 53.

Further, in each of the foregoing embodiments, means are provided for lockably hitching the trailer coupler to the vehicle hitch. As here preferably embodied, this means comprises an elongated hexagonal nut 16 adapted to thread onto bolt 15, which has a portion of the threads cut away. As nut 16 tightens onto bolt 15, a bifurcated tongue member (not shown) is drawn up under the vehicle ball hitch thereby securing the trailer coupler to the vehicle hitch. Nut 16 is tightened until one of holes 19, 19a is aligned with the cut-out portion of bolt 15, whereupon nut 16 may be locked in the tightened position by inserting the shackle of a padlock through one of the holes.

Assemblage of each of the foregoing embodiments of the invention to a trailer coupler is as follows:

A hole of suitable size to accommodate the unthreaded portion 28 of bushing 26 is bored through the top of the spherical housing portion of a trailer tongue or coupler, whereupon legs 22 of the counter attachment are slipped over the front end of the coupler housing to position threaded bore 21 of plate 20 over the housing borehole. Bushing 26 is then threaded into plate 20 and tightened down onto the plate until extensions 22a of legs 22 and shoulder 29 of the bushing firmly engage the bottom edges and top surface, respectively, of the spherical housing. Any additional slack between the plate and housing may be taken up by set-screw 18, threaded into bore 23 of plate 20, and adapted to bear against the top of the coupler housing. Rod 35 on rack 70 is thereafter slidably received by bushing 26 and held in position for displacement by return spring 46 acting on cross-bar 42 received by guide slot 45. In the embodiment of FIGURES 1–4, pull spring 48 is connected to cross-bar 42 and counter arm 25 to operatively associate rod 35 with registering mechanism 24. In the embodiment of FIGURES 5-6, counter arm 61 of registering mechanism is rested on shoulder 60 of rod 35. In the embodiment of FIGURES 7-8, rack 70 is meshed with pinion 75 to become operatively associated with the registering mechanism.

Operation of the counter attachment of the invention is as follows:

The owner of a trailer to be rented out by an independent rental agency assembles either of the counter embodiments to the trailer coupler as above described and thereafter slips cover 50 over the unit, locking the cover to the base plate by means of lock-screw 53 and holding the key in his possession. Upon renting a trailer, the rental agency hitches the trailer coupler to a ball hitch provided on the pulling vehicle, the coupler being firmly secured thereto by threading elongated nut 16 onto bolt 15. This action draws the ball hitch substantially fully into cavity 14 of housing 13, axially displacing the lower portion of the reciprocable plunger therefrom, whereby the counter arm is actuated to register the displacement of the plunger on the registering mechanism. The rental agency then inserts a padlock in nut 16, through either of the open passages formed by the alignment of either hole 19 or 19a with the cut away portion of bolt 15, thereby locking the trailer to the pulling vehicle. The trailer then cannot be unhitched until it is returned to the rental agency. Upon unhitching, spring 46 returns the plunger into cavity 14 in position for registering a subsequent hitching of the trailer to another vehicle.

It will be seen from the foregoing description that the counter attachment of this invention provides an accurate, reliable means for determining the number of times a trailer has been used. The lockable cover prevents manual actuation of the register counter arm, the removability of the cover being controlled by the trailer owner. The elongated nut and cut-out bolt provide a means for locking the trailer to the vehicle hitch, preventing unhitching and rehitching by the trailer user which would make the registering mechanism inaccurate as to the number of times the trailer is rented. Additionally, to prevent unintentional or accidental actuation of the plunger by hand or otherwise, when the trailer is disconnected, the end of the plunger extending into the coupler housing cavity is pointed and a stiff return spring 46 is provided so as to strongly resist axial displacement of the plunger.

The invention in its broader aspects is not limited to the specific embodiments herein shown and described but departures may be made therefrom within the scope of the accompanying claims, without departing from the principles of the invention and without sacrificing its chief advantages.

What is claimed is:

1. In combination, a counter attachment adapted to be mounted on a trailer coupler for registering the number of times the trailer is connected to a vehicle trailer hitch, comprising: a base plate; means for mounting said base plate on said trailer coupler; a plunger member reciprocally mounted on said base plate and extending through said trailer coupler so as to engage a vehicle trailer hitch and be axially displaced when said trailer coupler is connected to a vehicle, said plunger member remaining in engagement with said vehicle trailer hitch in said axially displaced position while said trailer coupler is connected to said vehicle; a registering mechanism carried by said base plate; means operatively associating said plunger member with said registering mechanism; return-biasing means operating to position said plunger member for axial displacement, whereby each connection of said trailer coupler to a vehicle is registered on said registering mechanism; and lockable cover means housing said plunger member and said registering mechanism.

2. A counter attachment as claimed in claim 1, including means for lockably connecting said trailer coupler to a vehicle.

3. In combination, a trailer coupler and a counter attachment mounted on said trailer coupler for registering the number of times the trailer is connected to a vehicle trailer hitch, said counter attachment comprising: a base plate; means for mounting said base plate on said trailer coupler; a plunger member reciprocally mounted in said base plate and extending through said trailer coupler so as to engage a vehicle trailer hitch and be axially displaced when said trailer coupler is connected to a vehicle, said plunger member remaining in engagement with said vehicle trailer hitch in said axially displaced position while said trailer coupler is connected to said vehicle; a registering mechanism carried by said base plate; means operatively associating said plunger member with said registering mechanism; return-biasing means operating to position said plunger member for axial displacement, whereby each connection of said trailer coupler to a vehicle is registered on said registering mechanism; and lockable cover means housing said plunger member and said registering mechanism.

References Cited by the Examiner

UNITED STATES PATENTS

| 668,294 | 2/1901 | Michael | 235—91 |
| 672,012 | 4/1901 | Roper | 235—91 |
| 3,139,291 | 12/1961 | Geresy | 280—511 X |

FOREIGN PATENTS

| 26,396 | 1911 | Great Britain. |

RICHARD B. WILKINSON, *Primary Examiner.*

LEO SMILOW, LOUIS J. CAPOZI, *Examiners.*

C. G. COVELL, J. G. MURRAY, *Assistant Examiners.*